(12) United States Patent
Gates, Jr.

(10) Patent No.: US 12,181,213 B1
(45) Date of Patent: Dec. 31, 2024

(54) COOLER FOR USE ON MARINE VESSELS

(71) Applicant: Daniel L. Gates, Jr., South Bend, IN (US)

(72) Inventor: Daniel L. Gates, Jr., South Bend, IN (US)

(*) Notice: Subject to any disclaimer, the term of this patent is extended or adjusted under 35 U.S.C. 154(b) by 441 days.

(21) Appl. No.: 17/373,980

(22) Filed: Jul. 13, 2021

Related U.S. Application Data

(60) Provisional application No. 63/053,178, filed on Jul. 17, 2020.

(51) Int. Cl.
| | |
|---|---|
| *F25D 3/08* | (2006.01) |
| *B32B 1/00* | (2006.01) |
| *B32B 3/06* | (2006.01) |
| *B32B 7/022* | (2019.01) |
| *B65D 81/18* | (2006.01) |
| *B65D 81/38* | (2006.01) |
| *F16B 5/06* | (2006.01) |
| *A45C 11/22* | (2006.01) |
| *A45C 13/10* | (2006.01) |
| *A45C 13/30* | (2006.01) |
| *B60R 9/00* | (2006.01) |
| *B63B 25/00* | (2006.01) |
| *F25D 3/06* | (2006.01) |

(52) U.S. Cl.
CPC ............... *F25D 3/08* (2013.01); *B32B 1/00* (2013.01); *B32B 3/06* (2013.01); *B32B 7/022* (2019.01); *B65D 81/18* (2013.01); *B65D 81/38* (2013.01); *B65D 81/3897* (2013.01); *F16B 5/0621* (2013.01); *A45C 11/22* (2013.01); *A45C 13/1076* (2013.01); *A45C 13/30* (2013.01); *B32B 2307/304* (2013.01); *B32B 2307/7265* (2013.01); *B32B 2439/46* (2013.01); *B32B 2605/12* (2013.01); *B60R 9/00* (2013.01); *B63B 25/004* (2013.01); *F25D 3/06* (2013.01)

(58) Field of Classification Search
CPC ..... F16B 5/0621; A45C 13/1076; B60R 9/00; B63B 25/004; F25D 3/06
See application file for complete search history.

(56) References Cited

U.S. PATENT DOCUMENTS

| | | | | |
|---|---|---|---|---|
| 3,163,338 | A * | 12/1964 | Gottsegen | B65D 25/32 224/560 |
| 5,165,198 | A * | 11/1992 | Kilian, III | A01K 97/05 383/41 |
| 5,305,544 | A * | 4/1994 | Testa, Jr. | A01K 97/05 206/315.11 |
| 6,367,403 | B1 * | 4/2002 | Carter | A01K 97/06 114/364 |

(Continued)

FOREIGN PATENT DOCUMENTS

CA        2548064 C        11/2007

*Primary Examiner* — Peter N Helvey
(74) *Attorney, Agent, or Firm* — Taft Stettinius & Hollister LLP

(57) ABSTRACT

An exemplary method includes placing one or more items in a cooler that includes a stowage compartment and a plurality of adjustable straps. The method further includes attaching the cooler to a boat using the adjustable straps and placing the stowage compartment outside the boat such that the stowage compartment is adjacent a hull of the boat. The method further includes adjusting a height of the stowage compartment relative to the boat, which involves adjusting lengths of the adjustable straps.

14 Claims, 6 Drawing Sheets

(56) References Cited

U.S. PATENT DOCUMENTS

| | | | | |
|---|---|---|---|---|
| 8,371,548 B1* | 2/2013 | Bishop | ............... | A45C 5/045 |
| | | | | 224/406 |
| 8,960,477 B1 | 2/2015 | Bishop | | |
| 9,113,686 B1 | 8/2015 | Bishop | | |
| 9,150,353 B2* | 10/2015 | Jackson | ............... | B65F 1/141 |
| 9,340,258 B1 | 5/2016 | Long | | |
| 9,726,424 B1* | 8/2017 | Sandberg | ............... | A45C 11/20 |
| 10,717,499 B1* | 7/2020 | Street | ............... | B65D 25/22 |
| 10,994,813 B1* | 5/2021 | Street | ............... | B65D 81/3813 |
| 2007/0028642 A1* | 2/2007 | Glade | ............... | A61B 90/98 |
| | | | | 62/457.2 |
| 2007/0095998 A1 | 5/2007 | Gray | | |
| 2008/0001373 A1* | 1/2008 | Vaughn | ............... | B60B 35/10 |
| | | | | 62/457.1 |
| 2009/0049859 A1* | 2/2009 | Moon | ............... | A45C 15/00 |
| | | | | 62/457.7 |
| 2012/0125966 A1 | 5/2012 | Greenspon | | |
| 2018/0178887 A1 | 6/2018 | Pacini | | |
| 2018/0199742 A1 | 7/2018 | Rogers et al. | | |
| 2019/0077577 A1 | 3/2019 | Brandes | | |
| 2019/0193918 A1* | 6/2019 | Mitchell | ............... | A45C 7/0077 |
| 2023/0106897 A1* | 4/2023 | McMillan | ............... | F25D 3/06 |
| | | | | 280/839 |

* cited by examiner

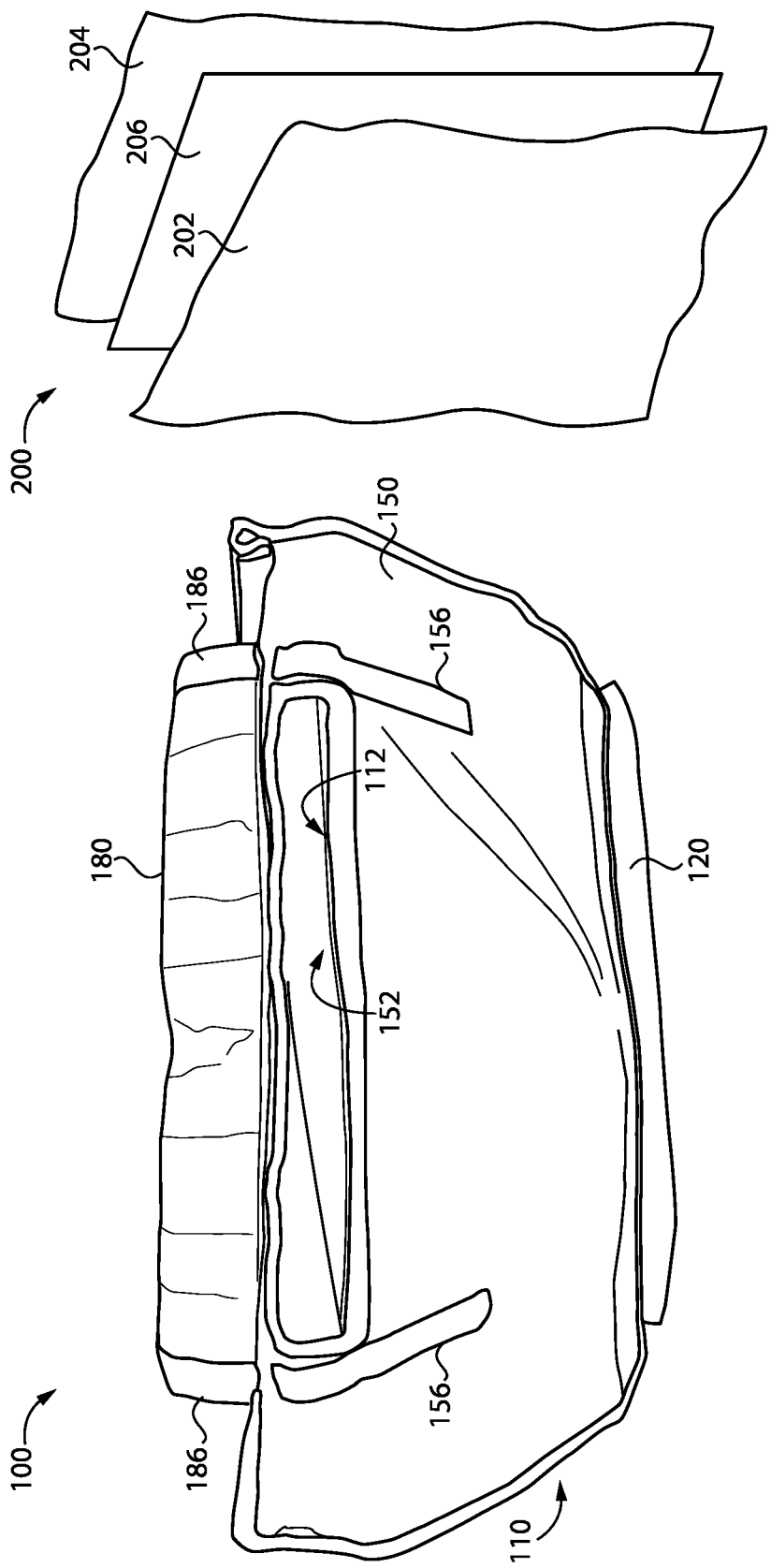

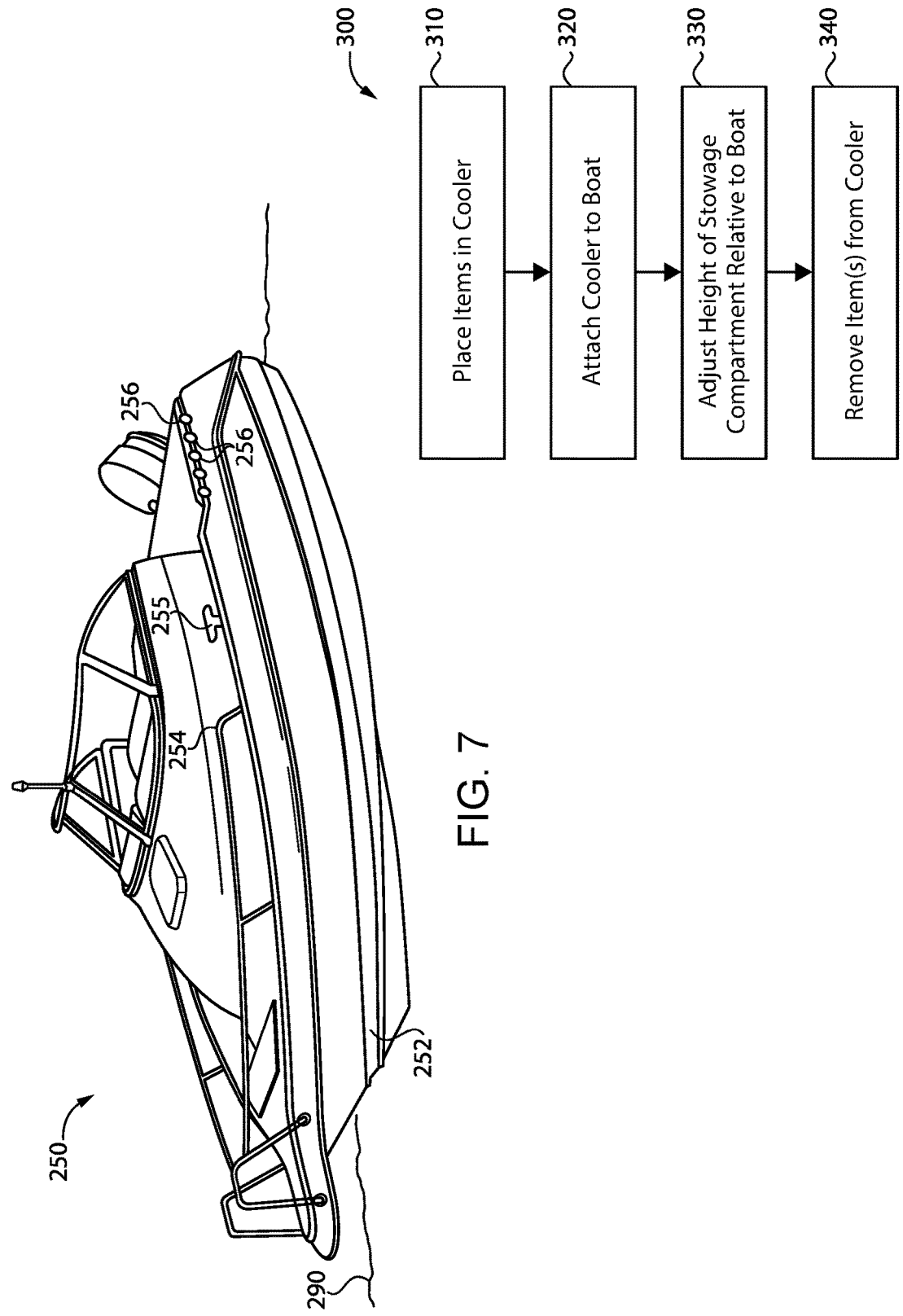

COOLER FOR USE ON MARINE VESSELS

CROSS-REFERENCE TO RELATED APPLICATIONS

The present application claims the benefit of U.S. Provisional Patent Application No. 63/053,178, filed Jul. 17, 2020, the contents of which are incorporated by reference in their entirety.

TECHNICAL FIELD

The present disclosure generally relates to coolers, and more particularly but not exclusively relates to coolers configured for use on marine vessels.

BACKGROUND

When boating, it is common for the boat to anchor or otherwise remain relatively stationary while the passengers exit the boat to swim or perform other recreational activities in the water surrounding the boat. One issue that can arise is the provision of beverages to those in the water. For example, should the cooler be stored in the boat, persons getting in and out of the water to retrieve beverages may track in an unnecessary amount of water, which may make the floor slick or, in the case of carpet, waterlogged. Moreover, getting in and out of the boat may be an inconvenience. For these reasons among others, there remains a need for further improvements in this technological field.

SUMMARY

An exemplary method includes placing one or more items in a cooler that includes a stowage compartment and a plurality of adjustable straps. The method further includes attaching the cooler to a boat using the adjustable straps and placing the stowage compartment outside the boat such that the stowage compartment is adjacent a hull of the boat. The method further includes adjusting a height of the stowage compartment relative to the boat, which involves adjusting lengths of the adjustable straps. Further embodiments, forms, features, and aspects of the present application shall become apparent from the description and figures provided herewith.

BRIEF DESCRIPTION OF THE FIGURES

FIG. 4 is a perspective illustration of the cooler with the primary flap in a closed position and a secondary flap in an open position.

FIG. 5 is a schematic illustration of a panel according to certain embodiments.

FIG. 7 is a perspective view of a boat that may be utilized in certain embodiments.

FIG. 8 is a schematic flow diagram of a process according to certain embodiments.

DETAILED DESCRIPTION OF ILLUSTRATIVE EMBODIMENTS

Figure 1:
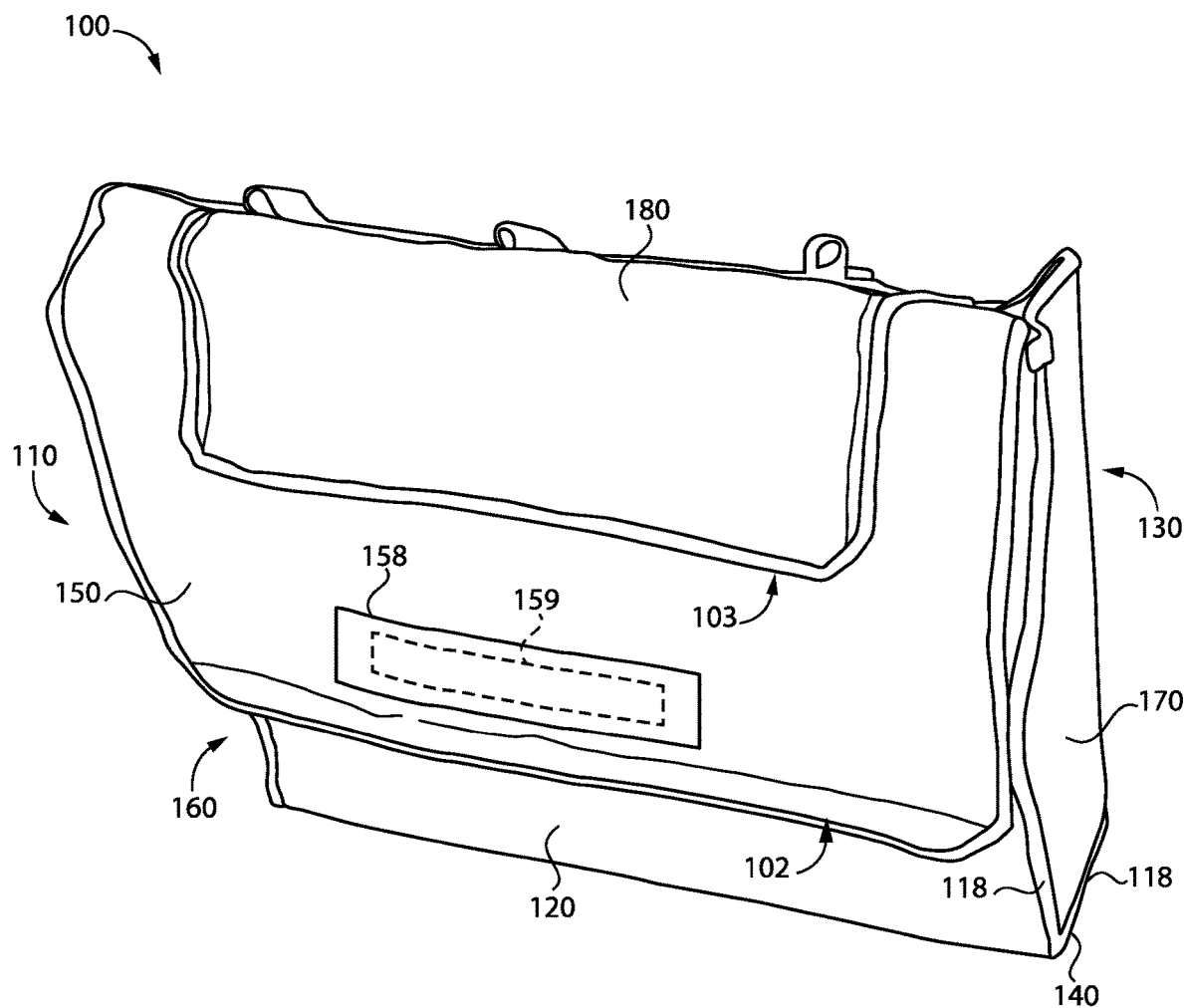
FIG. 1 is a perspective illustration of a front portion of a cooler according to certain embodiments.
Figure 2:
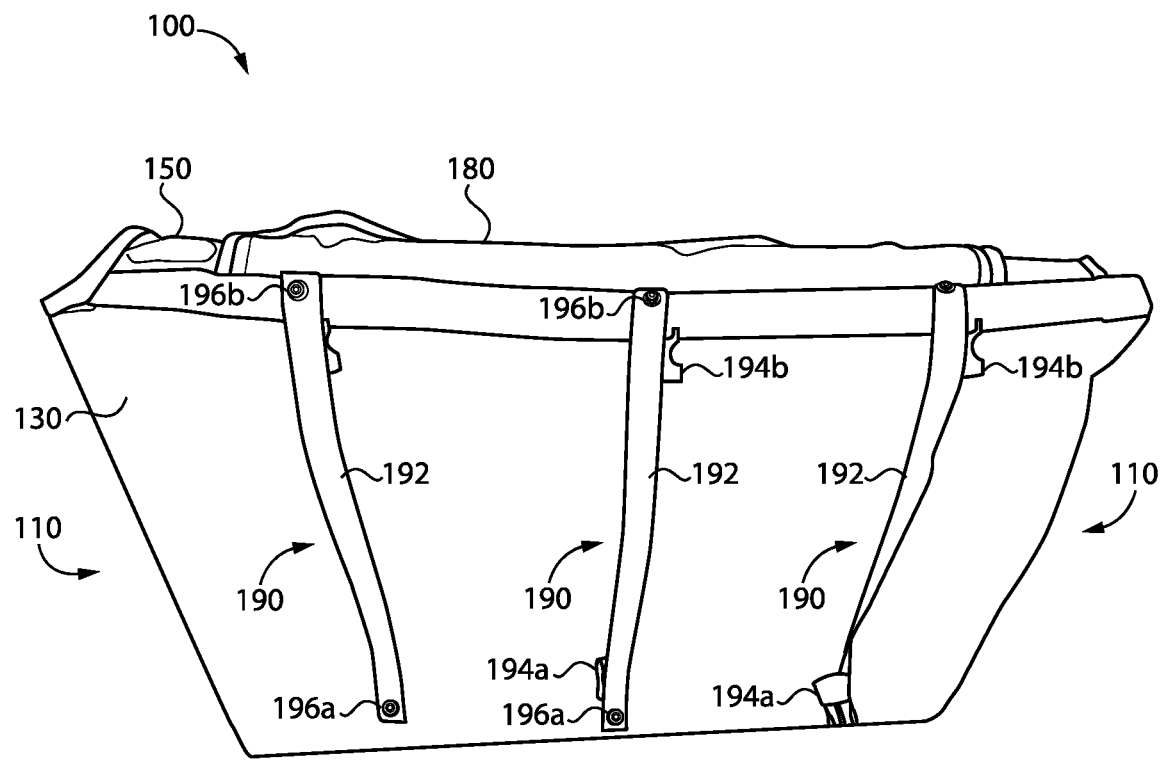
FIG. 2 is a perspective illustration of a rear portion of the cooler illustrated in FIG. 1.
Figure 3:
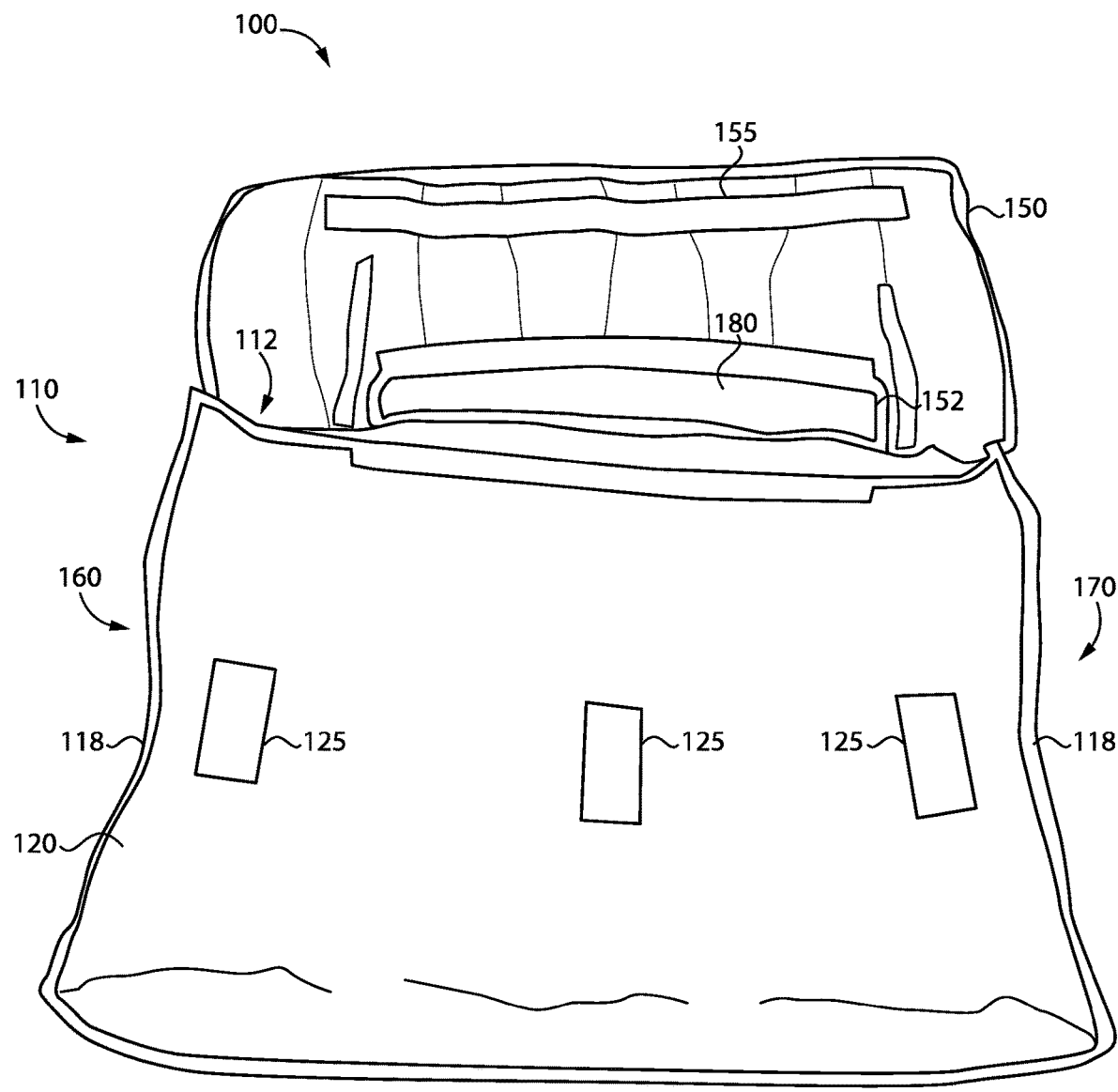
FIG. 3 is a perspective illustration of the cooler with a primary flap in an open position.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIGS. 1-4, a cooler 100 according to certain embodiments includes a stowage compartment 110 and a plurality of adjustable straps 190 attached to the stowage compartment 110. The stowage compartment 110 generally includes a front panel 120, a rear panel 130 opposite the front panel 120, a bottom panel 140, a top opening 112 opposite the bottom panel, and a primary flap 150 extending from the rear panel 130 and operable to cover the top opening 112 when the primary flap 150 is in a primary flap closed position. The stowage compartment 110 may further include a first side panel 160 and a second side panel 170 opposite the first side panel 160. As described herein, the primary flap 150 of the illustrated embodiment includes a flap opening 152 that is aligned with the top opening 112 when the primary flap 150 is in its closed position, and the stowage compartment 110 further includes a secondary flap 180 operable to cover the flap opening 152 when the secondary flap 180 is in a secondary flap closed position.

With additional reference to FIG. 5, illustrated therein is an example panel 200. One or more of the panels 120, 130, 140, 160, 170 may, for example, take the form of the example panel 200. The panel 200 has an outer layer 202 formed of a flexible waterproof material, such as a nylon fabric (e.g., Cordura®) and an insulating inner layer 204, which may likewise be flexible and waterproof. The panel 200 may further include a support panel 206 formed of a relatively rigid material, such as plastic, and the support panel 206 may be positioned between the outer layer 202 and the inner layer 204. As used herein, the term "relatively rigid" indicates that the rigidity of the support panel 206 is greater than the rigidity of the outer layer 202 and the inner layer 204, such that the support panels 206 aid in retaining the overall shape of the stowage compartment 110. However, it should be appreciated that the support panels 206 may be somewhat flexible.

Figure 6:
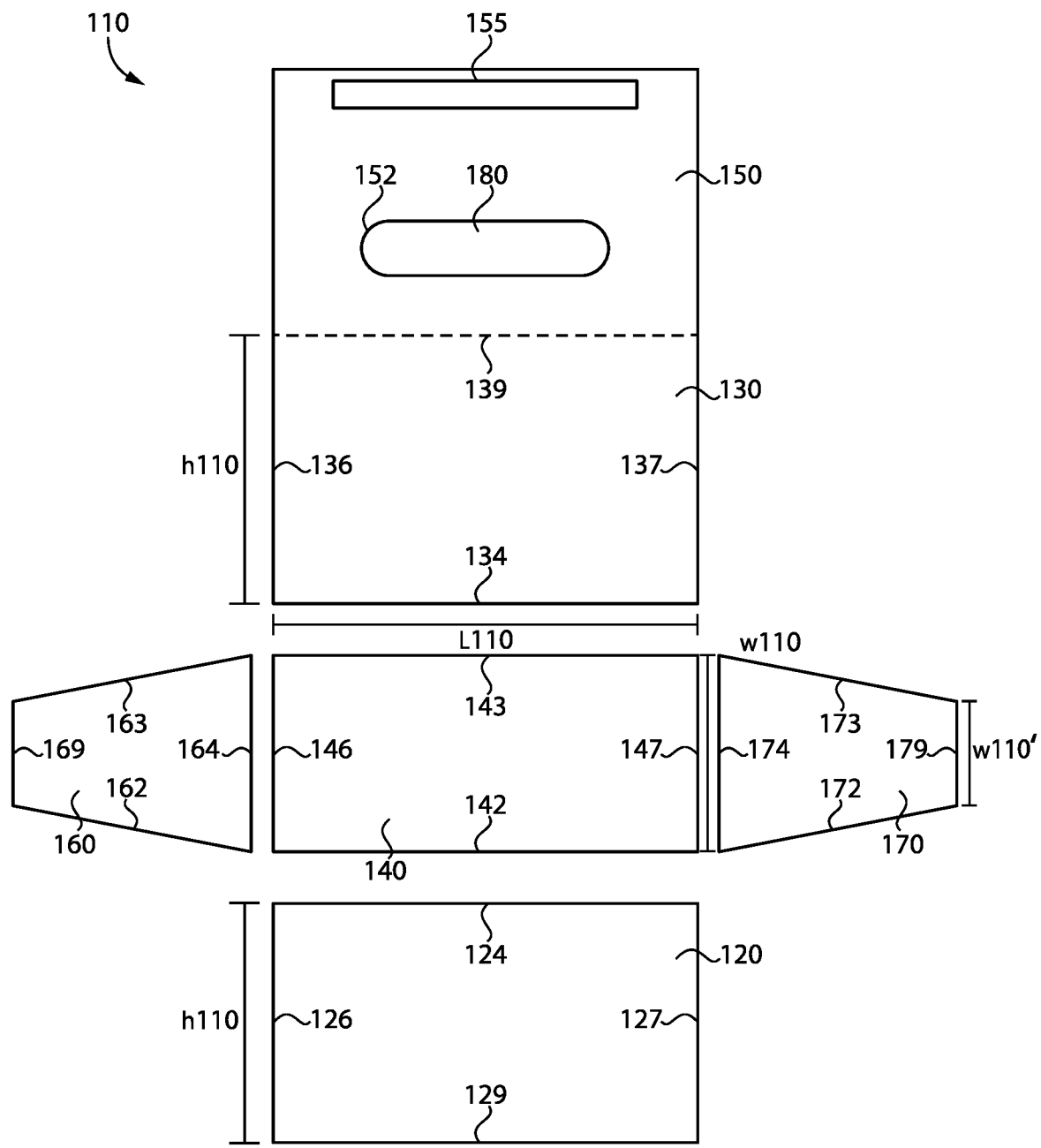
FIG. 6 is a plan view of a stowage compartment prior to assembly.

With additional reference to FIG. 6, the stowage compartment 110 has a length L110, a first width w110, and a height h110. As described herein, the overall width of the stowage compartment 110 tapers inward from the first width w110 to a second width w110' such that the top opening 112 is smaller than the bottom panel 140, which may aid in providing stability to the stowage compartment 110.

The front panel 120 includes a bottom edge 124, a first side edge 126, a second side edge 127 opposite the first side edge 124, and a top edge 129 opposite the bottom edge 124. While other geometries are contemplated, in the illustrated form, the front panel 120 is generally rectangular. More particularly, each of the bottom edge 124 and the top edge 129 has the length L110, and each of the side edges 124, 127 has the height h110. The front panel 120 may, for example, be formed along the lines of the above-described panel 200. Attached to a front side of the front panel 120 are one or more attachment devices 125 that mate with or otherwise engage a corresponding attachment device 155 formed on the primary flap 150 to aid in retaining the primary flap 150 in the closed position.

The rear panel 130 includes a bottom edge 134, a first side edge 136, a second side edge 137 opposite the first side edge 136, and a top edge 139 opposite the bottom edge 134. While other geometries are contemplated, in the illustrated form, the rear panel 130 is generally rectangular. More particularly, each of the bottom edge 134 and the top edge 139 has the length L110, and each of the side edges 134, 137 has the height h110. The rear panel 130 may, for example, be formed along the lines of the above-described panel 200. As noted above, the primary flap 150 extends from the rear panel 130. More particularly, the primary flap 150 extends from the top edge 139 of the rear panel 130.

The bottom panel 140 includes a front edge 142, a rear edge 143 opposite the front edge 142, a first side edge 146, and a second side edge 147 opposite the first side edge 146. While other geometries are contemplated, in the illustrated form, the bottom panel 140 is generally rectangular. More particularly, each of the front edge 142 and the rear edge 143 has the length L110, and each of the side edges 146, 147 has the first width w110. The bottom panel 140 may, for example, be formed along the lines of the above-described panel 200.

The primary flap 150 extends from the rear panel 130, and includes a flap opening 152. When the primary flap 150 is in the primary flap closed position, the flap opening 152 is aligned with the top opening 112 of the stowage compartment 110. In certain embodiments, the primary flap 150 may be formed along the lines of the above-described panel 200. It is also contemplated that the support panel 206 may be omitted from the primary flap 150 such that the primary flap 150 remains more flexible. A rear side of the primary flap 150 (i.e., the side that faces rearward when the primary flap 150 is closed) includes at least one attachment device 155 that mates with or otherwise engages a corresponding attachment device 125 formed on the front panel 120 to aid in retaining the primary flap 150 in the primary flap closed position. A front side of the primary flap 150 likewise includes at least one attachment device 156 that mates with or otherwise engages a corresponding attachment device 186 of the secondary flap 180 to aid in retaining the secondary flap 180 in a closed position relative to the primary flap 150.

In certain embodiments, the primary flap 150 may further include a removable label 158 including indicia 159. The removable label 158 may be attached to the primary flap 150 by any suitable attachment mechanism, such as, for example, a hook-loop fastener, a hook-hook fastener, or snaps. In certain forms, the indicia 159 may be generic indicia, such as the word "Beverages." It is also contemplated that the indicia 159 may be personalized indicia, such as the name or company of the purchaser, or indicia selected by such a purchaser. In certain embodiments, a method of manufacturing may involve providing a generic form of the removable label 158 to certain customers while providing a personalized form of the removable label 158 to those customers that request such a personalized label. Moreover, while the illustrated label 158 is removable, it is also contemplated that the The first side panel 160 includes a front edge 162, a rear edge 163 opposite the front edge 162, a bottom edge 164, and a top edge 169 opposite the bottom edge 164. While other geometries are contemplated, in the illustrated form, the first side panels 160 is generally trapezoidal. More particularly, the first side panel 160 tapers inward from the greater first width w110 at the bottom edge 164 to the lesser second width w110' at the top edge 169. The first side panels 160 may, for example, be formed along the lines of the above-described panel 200.

The second side panel 170 includes a front edge 172, a rear edge 173 opposite the front edge 172, a bottom edge 174, and a top edge 179 opposite the bottom edge 174. While other geometries are contemplated, in the illustrated form, each of the side panels 160, 170 is generally trapezoidal. More particularly, each side panel 160, 170 tapers inward from the first width w110 at the bottom edge 164, 174 to the lesser second width w110' at the top edge 169, 179. The side panels 160, 170 may, for example, be formed along the lines of the above-described panel 200.

During manufacture, the panels 120, 130, 140, 160, 170 may be joined at the edges thereof via a waterproof seal, such as nylon edging 114. For example, the front panel bottom edge 124 may be joined with the bottom panel front edge 142 via nylon edging to form a front bottom edge of the stowage compartment. Similarly, the front panel first side edge 126 may be joined with the first side panel front edge 162 to form a front first side edge of the stowage compartment. Other pairs of edges (e.g., the front second side edges 127 and 172, the bottom rear edges 134 and 143, the rear first side edges 136 and 163, the rear second side edges 137 and 173, the bottom first side edges 146 and 164, and the bottom second side edges 147, 174) may similarly be joined to form the stowage compartment 110 as a waterproof container. Thus, when the stowage compartment 110 is formed, the stowage compartment 110 is operable to hold water without leaking.

It is to be appreciated that while the panels 120, 130, 140, 160, 170 of the illustrated embodiment are provided as discrete panels that are joined via waterproof sealing (e.g., the edging 118), two or more of the panels may be integrally formed with one another to obviate the need for such sealing at the edges thereof. For example, the front panel 120 and the bottom panel 140 may be defined at least in part by a continuous piece of material that defines the outer layer 202 of each panel 120, 140 and/or a continuous piece of material that defines the inner layer 204 of each panel 120, 140.

As noted above, the cooler 100 includes several sets of attachment devices that aid in retaining the primary flap 150 and the secondary flap 180 in the closed positions thereof. Each pair of corresponding attachment devices may be considered to define an attachment mechanism. For example, the attachment devices 125, 155 may be considered to constitute a primary flap attachment mechanism 102, and the attachment devices 156, 186 may be considered to constitute a secondary flap attachment mechanism 103. In the illustrated form, each of the flap attachment mechanisms 102, 103 are provided in the form of a hook-loop or a hook-hook fastener (e.g., Velcro®). For example, the primary flap attachment mechanism 102 may be provided in the form of a hook-loop fastener, in which case the attachment device(s) 125 may be provided in the form of a hook portion, and the attachment device(s) 155 may be provided in the form of a loop portion. It is also contemplated that one or both of the flap attachment mechanisms 102, 103 may take another form, such as that of a clip, a snap, or a button.

Each of the adjustable straps 190 generally includes a strap portion 192 and at least one attachment device that aids in releasably securing the cooler 100 to a larger object, such as a boat. In certain embodiments, one or more straps 190 may include a first strap attachment mechanism 194 operable to retain the strap portion 192 in a looped configuration. In the illustrated form, the first strap attachment mechanism 194 is provided in the form of a clip mechanism including a first clip portion 194a (e.g., one of a male clip portion or a female clip portion) and a second clip portion 194b (e.g., the other of a male clip portion or a female clip portion) operable to mate with the first clip portion 194a. One or both of the clip portions 194a, 194b may have a variable position relative to the strap portion 192 such that the effective length of the adjustable strap 190 is adjustable via the first strap attachment mechanism 194.

In the illustrated form, each adjustable strap 190 further includes a second strap attachment mechanism 196 operable to retain the strap portion 192 in a looped configuration. In the illustrated form, the second strap attachment mechanism 196 is provided in the form of a snap mechanism including a first snap portion 196a (e.g., one of a male snap portion or a female snap portion) and a second snap portion 196b (e.g., the other of a male snap portion or a female snap portion) operable to mate with the first snap portion 196a. One or both of the snap portions 196a, 196b may have a variable position relative to the strap portion 192 such that the effective length of the adjustable strap 190 is adjustable via the second strap attachment mechanism 196.

In certain embodiments, the effective length of each adjustable strap 190 may be adjusted by adjusting a position of one or more of the attachment devices 194a, 194b, 196a, 196b relative to the strap. Additionally or alternatively, the effective length of each adjustable strap 190 may be adjusted in another manner. For example, each adjustable strap 190 may include a locking slider that adjusts the effective length of the adjustable strap 190. It is also contemplated that the effective length of the adjustable straps 190 may be adjusted in other manners that would occur to those skilled in the art. In certain embodiments, the cooler 100 may be provided with additional strap extensions similar in form to the adjustable straps 190. Such extensions may be utilized for larger boats to ensure that the stowage compartment 110 is able to reach an accessible level near the water surrounding the boat.

With additional reference to FIG. 7, illustrated therein is a boat 250 that may be utilized in connection with the cooler 100. The boat 250 generally includes a hull 252, a rail 254, and a cleat 255. In the illustrated form, the boat 250 further includes a plurality of snap attachment devices 256 that may be utilized to secure a boat cover to the boat 250. As described herein, the illustrated cooler 100 can be attached to the boat 250 via each and any of the rail 254, the cleat 255, and the snap attachment devices 256.

With additional reference to FIG. 8, an exemplary process 300 that may be performed using the cooler 100 is illustrated. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 300 is described herein with specific reference to the cooler 100 illustrated in FIGS. 1-6 and the boat 250 illustrated in FIG. 7, it is to be appreciated that the process 300 may be performed with coolers and/or boats having additional or alternative features.

The process 300 may begin with block 310, which generally involves placing one or more items in the stowage compartment 110 of the cooler 100. For example, block 310 may involve opening the primary flap 150 to expose the top opening 112, and placing the item(s) in the stowage compartment 110 via the exposed top opening 112. The item(s) may, for example, include ice and canned or bottled beverages. Block 310 may further involve closing the stowage compartment 110 by placing the primary flap 150 in its closed position, in which the primary flap 150 generally covers the top opening 112. With the cooler 100 filled, the insulating nature of the stowage compartment 110 aids in preventing melting of the ice and warming of the beverages. Additionally, the waterproof nature of the stowage compartment 110 ensures that melting ice does not drip from the stowage compartment 110.

The process 300 may include block 320, which generally involves attaching the cooler 100 to the boat 250 using the adjustable straps 190. In certain embodiments, block 320 may involve forming a loop about the rail 254 and/or the cleat 255 and securing the adjustable straps 190 in this looped configuration using one or both of the strap attachment mechanisms 194, 196. Additionally or alternatively, block 320 may involve mating one or more of the first snap portions 196a with a corresponding one of the snap attachment devices 256 to secure the cooler 100 to the boat 250. Block 320 may further include placing the stowage compartment 110 outside the boat 250 such that the stowage compartment 110 is adjacent the hull 252.

The process 300 may include block 330, which generally involves adjusting the height of the stowage compartment 110 relative to the boat 250 by adjusting the lengths of the adjustable straps 190. In certain embodiments, block 330 may involve adjusting the height of the stowage compartment 110 relative to the boat 250 such that the bottom panel 140 is positioned above the water 290. In certain embodiments, block 330 may involve adjusting the height of the stowage compartment 110 relative to the boat 250 such that the bottom panel 140 is submerged in the water 290. Those skilled in the art will readily appreciate that the waterproof nature of the stowage compartment 110 will prevent the water 290 from seeping into the stowage compartment 110, which may contaminate the item(s) and/or be undesirable for other reasons.

The process 300 may include block 340, which generally involves retrieving or otherwise removing one or more of the stored items from the stowage compartment 110. In certain embodiments, such as those in which the primary flap 150 includes the flap opening 152 and the secondary flap 180, block 340 may be performed with the primary flap 150 in its closed position, where it may be secured by the primary flap attachment mechanism 102. In such forms, block 340 may involve disengaging the secondary flap attachment mechanism 103 to permit opening of the secondary flap 180 to thereby expose the flap opening 152, and reaching through the flap opening 152 to retrieve one or more items, such as a beverage. Due to the fact that the stowage compartment 110 is positioned outside the boat 250 and in the general vicinity of the water 290, the user need not enter the boat 250 in order to retrieve the item(s). Additionally, due to the fact that the primary flap 150 remains closed while only the smaller secondary flap 180 is opened, less relatively warm air enters the stowage compartment 110. As a result, the temperature within the stowage compartment 110 raises less than if the entire primary flap 150 were opened to expose the full top opening 112. It should be appreciated, however, that in other embodiments (e.g., those in which the primary flap 150 does not include the flap opening 152), the primary flap 150 may be opened to retrieve the item(s).

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   placing one or more items in a cooler, the cooler comprising a stowage compartment and an adjustable strap connected with the stowage compartment;
   attaching the cooler to a boat comprising a first snap, wherein the adjustable strap comprises a second snap, wherein attaching the cooler to the boat comprises attaching the adjustable strap to the boat, and wherein attaching the adjustable strap to the boat comprises engaging the first snap with the second snap;
   placing the stowage compartment outside the boat such that the stowage compartment is adjacent a hull of the boat; and
   adjusting a height of the stowage compartment relative to the boat, wherein adjusting the height of the stowage compartment comprises adjusting a length of the adjustable strap.

2. The method of claim 1, wherein the stowage compartment comprises a front panel, a back panel, a bottom panel, an upper opening opposite the bottom panel, and a primary flap extending from the back panel, the primary flap covering the upper opening when the primary flap is in a first closed position.

3. The method of claim 2, further comprising covering the upper opening with the primary flap, wherein covering the upper opening with the primary flap comprises attaching the primary flap to the front panel via one or more attachment mechanisms.

4. The method of claim 3, wherein each attachment mechanism comprises at least one of a snap mechanism, a clip mechanism, a hook-loop fastener, or a hook-hook fastener.

5. The method of claim 2, wherein the primary flap comprises:
   a flap opening aligned with the top opening when the primary flap is in the first closed position;
   a secondary flap operable to cover the flap opening, the secondary flap comprising a first attachment device; and
   a second attachment device configured to engage the first attachment device to secure the secondary flap in a second closed position.

6. The method of claim 5, further comprising retrieving at least one of the one or more items from the stowage compartment via the flap opening.

7. The method of claim 2, wherein the boat is afloat in water; and
   wherein adjusting the height of the stowage compartment relative to the boat comprises adjusting the lengths of the adjustable straps such that the bottom panel is submerged in the water.

8. The method of claim 2, wherein the boat is afloat in water; and
   wherein adjusting the height of the stowage compartment relative to the boat comprises adjusting the lengths of the adjustable straps such that the bottom panel is positioned above the water.

9. The method of claim 1, wherein the stowage compartment is waterproof.

10. The method of claim 1, wherein the stowage compartment is formed of a flexible, non-rigid material.

11. The method of claim 10, wherein each panel further comprises a relatively rigid support plate that retains shape of the front panel, the back panel, and the bottom panel.

12. The method of claim 1, wherein each strap includes a first clip portion and a second clip portion operable to engage the first clip portion; and wherein attaching the cooler to the boat comprises wrapping each strap around a fixed portion of the boat and engaging the first clip portion with the second clip portion.

13. A method, comprising:
placing one or more items in a cooler, the cooler comprising a stowage compartment and an adjustable strap connected with the stowage compartment;
attaching the cooler to a boat, wherein attaching the cooler to the boat comprises attaching the plurality of adjustable straps to the boat;
placing the stowage compartment outside the boat such that the stowage compartment is adjacent a hull of the boat; and
adjusting a height of the stowage compartment relative to the boat, wherein adjusting the height of the stowage compartment comprises adjusting a length of the adjustable strap such that a bottom of the stowage compartment is submerged in the water.

14. The method of claim 13, wherein the boat comprises a plurality of first snaps;
wherein each adjustable strap comprises a corresponding and respective second snap operable to engage each of the first snaps; and
wherein attaching the cooler to the boat comprises engaging each of the second snaps with a corresponding and respective one of the first snaps.

\* \* \* \* \*